(12) United States Patent
Fan

(10) Patent No.: US 9,229,280 B2
(45) Date of Patent: Jan. 5, 2016

(54) LCOS PANEL AND METHOD OF MANUFACTURING THE SAME

(71) Applicant: OmniVision Technologies (Shanghai) Co., Ltd., Shanghai (CN)

(72) Inventor: Regis Fan, Shanghai (CN)

(73) Assignee: OMNIVISION TECHNOLOGIES (SHANGHAI) CO., LTD., Shanghai (CN)

( * ) Notice: Subject to any disclaimer, the term of this patent is extended or adjusted under 35 U.S.C. 154(b) by 247 days.

(21) Appl. No.: 13/865,835

(22) Filed: Apr. 18, 2013

(65) Prior Publication Data

US 2014/0085579 A1 Mar. 27, 2014

(30) Foreign Application Priority Data

Sep. 27, 2012 (CN) .......................... 2012 1 0367895

(51) Int. Cl.
*G02F 1/1339* (2006.01)
*G02F 1/1333* (2006.01)
*G02F 1/1362* (2006.01)
*G02F 1/1341* (2006.01)
*G02F 1/1337* (2006.01)
*G02F 1/1345* (2006.01)

(52) U.S. Cl.
CPC ............ *G02F 1/1339* (2013.01); *G02F 1/1333* (2013.01); *G02F 1/1337* (2013.01); *G02F 1/1341* (2013.01); *G02F 1/1345* (2013.01); *G02F 1/133351* (2013.01); *G02F 1/136277* (2013.01); *G02F 2201/121* (2013.01)

(58) Field of Classification Search
CPC .................. G02F 1/133351; G02F 1/136277; G02F 1/1339; G02F 1/1345; G02F 1/1341; G02F 2001/13415; G02F 1/1333

USPC ......................................... 349/187, 189, 190
See application file for complete search history.

(56) References Cited

U.S. PATENT DOCUMENTS

| | | | | |
|---|---|---|---|---|
| 2002/0054266 A1* | 5/2002 | Nishimura | ...................... | 349/149 |
| 2005/0213000 A1* | 9/2005 | Akimoto | ........................ | 349/113 |
| 2006/0023155 A1* | 2/2006 | Magana | ......................... | 349/154 |
| 2007/0297121 A1* | 12/2007 | Yoshida et al. | ................ | 361/523 |
| 2008/0105368 A1* | 5/2008 | Watanabe | ....................... | 156/250 |
| 2009/0195739 A1* | 8/2009 | Chang et al. | ................... | 349/110 |
| 2013/0242243 A1* | 9/2013 | Supon | ............................ | 349/122 |
| 2013/0242244 A1* | 9/2013 | Supon et al. | ................... | 349/122 |

* cited by examiner

*Primary Examiner* — Thanh-Nhan P Nguyen
*Assistant Examiner* — Jia Pan
(74) *Attorney, Agent, or Firm* — Blakely Sokoloff Taylor & Zafman LLP

(57) ABSTRACT

A method of manufacturing LCOS panel is disclosed. The method includes: providing a silicon substrate on which at least one conductive pad is formed and a transparent substrate on which a transparent electrode layer is formed; dispensing or coating a sealing material on a predetermined area of the silicon substrate or the transparent substrate; bonding the silicon substrate with the transparent substrate; singulating the bonded silicon substrate and transparent substrate such that at least one space is provided between the silicon substrate and the transparent substrate on an outer side of the sealing material and a part of the transparent electrode layer is exposed in the space; and dispensing a conductive adhesive into the space to connect the transparent electrode layer to the conductive pad. The method is able to achieve a smaller-size of the LCOS panels, a higher production yield and a lower process requirement.

22 Claims, 15 Drawing Sheets

LCOS PANEL AND METHOD OF MANUFACTURING THE SAME

CROSS-REFERENCES TO RELATED APPLICATIONS

This application claims the priority of Chinese patent application number 201210367895.3, filed on Sep. 27, 2012, the entire contents of which are incorporated herein by reference.

TECHNICAL FIELD

The present invention relates to flat panel display (FPD) technology, and more particular, to a liquid crystal on silicon (LCOS) panel and a manufacturing method thereof.

BACKGROUND

A liquid crystal on silicon (LCOS) panel employs semiconductor technology to control liquid crystal to "project" color images. LCOS panels have become a new-type reflective projective panel and have various advantages when compared to transmission-type liquid crystal displays (LCDs) and digital light procession (DLP) panels. Such advantages include higher light utilization, higher contrast image, smaller size, higher aperture ratio and mature fabrication technology. They can easily achieve high resolution and satisfying color performance. These advantages promise LCOS panels a predominant status in the future application field of large scale displays.

U.S. Pat. No. 5,963,289 discloses a manufacturing method of LCOS panel. As shown in FIG. 1, an LCOS panel manufactured by using this method includes a silicon substrate 400 and a glass substrate 500. A bond pad 700 for connecting to a peripheral circuit is provided on the silicon substrate 400 and a transparent electrode 530 is provided on the glass substrate 500. The silicon substrate 400 and the glass substrate 500 are asymmetrically scribed, and thereby the bond pad 700 on the silicon substrate 400 and a part of the transparent electrode 530 on the glass substrate 500 are exposed. In this method, in order to form an electrical connection between the LCOS panel and the peripheral circuit, the silicon substrate 400 of the LCOS panel is fixed on a printed circuit board (PCB) which provides a voltage to the silicon substrate 400 and the transparent electrode 530. In a general case, the bond pad 700 of the silicon substrate 400 is connected to the PCB through a wire, while the transparent electrode 530 is connected to the PCB through a conductive adhesive. For this reason, the silicon substrate 400 is designed to have an extension portion on one side and the glass substrate 500 is designed to have an extension portion, or overhang, on the opposite side. Electrodes for connecting to the peripheral circuit are located on the extension portions, respectively. In this method, the extension portions of the silicon substrate 400 and the glass substrate 500 protrude in opposite directions. As these extension portions are only for connection but not for display, an LCOS panel with such a structure will have a relatively large size.

To meet daily increasing demands for miniaturization of electronic products, various attempts have been made to reduce the size of LCOS panels. JP2005274665 discloses another LCOS panel, as shown in FIG. 2 and FIG. 3, the LCOS panel includes a silicon substrate 140 and a glass substrate 130, which are bonded together using a sealing material 151. A transparent conductive layer 132 is provided on the glass substrate 130, and common electrodes 161 are provided at four corners of the silicon substrate 140. The common electrodes 161 are located outside the area where the sealing material 151 is applied. A common material 162 is used to connect the transparent conductive layer 132 to the common electrodes 161. Compared with the LCOS panel as disclosed in U.S. Pat. No. 5,963,289, this LCOS panel eliminates the extension portion of the glass substrate 130. The connections between the transparent conductive layer 132 and the common electrodes 161 are achieved by using the common material 162, and the common voltage for the transparent conductive layer 132 is generated by some other circuit arranged on the silicon substrate. Therefore, this LCOS panel has a smaller size.

In JP2005274665, in order to prevent short circuit caused by contact between the common electrodes 161 and liquid crystal, and to prevent the common material 162, which is generally a conductive adhesive, from contaminating the liquid crystal, the common electrodes 161 are arranged outside the area where the sealing material 151 is applied. However, in the manufacturing process of the LCOS panel, as the sealing material 151 and the conductive adhesive (namely, the common material 162) are coated before the bonding of the silicon substrate 140 and the glass substrate 130, at which time the sealing material 151 and the conductive adhesive are not cured yet, the conductive adhesive may easily pass through the sealing material 151 and contact with the liquid crystal during or after the process of bonding the silicon substrate 140 and the glass substrate 130. As a result, the liquid crystal will be contaminated and short circuit will occur between the common electrodes 161 and the liquid crystal.

In addition, as shown in FIG. 3, in the above manufacturing process, as the areas of the sealing material 151 and the common electrodes 161 are nearly overlapped, it is almost impossible to prevent the contact between the conductive adhesive and the sealing material even if the materials are coated on predetermined areas with a strictly controlled accuracy. Thus, even a minor discrepancy generated in the process will lead to the overlapping between the conductive adhesive and the sealing material, and hence the contamination to liquid crystal by the conductive adhesive.

Overall, although the manufacturing method of the prior art is capable of reducing the size of an LCOS panel, its yield is very low. Further, critical manufacturing requirements will limit its application in mass production.

SUMMARY OF THE INVENTION

An objective of the present invention is to provide a liquid crystal on silicon (LCOS) panel and method of manufacturing the same which is capable of effectively reducing the size of an LCOS panel and achieving a higher production yield and a lower process requirement.

To achieve the above objective, the present invention provides a method of manufacturing liquid crystal on silicon (LCOS) panel, which includes:

providing a silicon substrate and a transparent substrate, the silicon substrate having at least one conductive pad formed thereon, the transparent substrate having a transparent electrode layer formed thereon;

dispensing or coating a sealing material on a predetermined area of the silicon substrate or the transparent substrate;

bonding the silicon substrate with the transparent substrate;

singulating the bonded silicon substrate and transparent substrate such that at least one space is provided between the silicon substrate and the transparent substrate on an outer side of the sealing material, a part of the transparent electrode layer being exposed in the space; and dispensing a conductive adhesive into the space to connect the transparent electrode layer to the conductive pad.

According to a preferred embodiment, the conductive pad is partly or entirely located in the space.

According to a preferred embodiment, the silicon substrate includes at least one display unit, each display unit including a display area and a surrounding area, the surrounding area surrounding the display area.

According to a preferred embodiment, dispensing or coating a sealing material on a predetermined area of the silicon substrate or the transparent substrate includes dispensing or coating a sealing material to form a closed ring surrounding the display area of each display unit or dispensing or coating a sealing material on a corresponding area of the transparent substrate.

According to a preferred embodiment, the method further includes dispensing liquid crystal onto the silicon substrate or the transparent substrate after dispensing or coating a sealing material on a predetermined area of the silicon substrate or the transparent substrate and before bonding the silicon substrate with the transparent substrate.

According to a preferred embodiment, dispensing or coating a sealing material on a predetermined area of the silicon substrate or the transparent substrate includes dispensing or coating a sealing material to form an unclosed ring surrounding the display area of each display unit or dispensing or coating a sealing material on a corresponding area of the transparent substrate, the unclosed ring having an opening.

According to a preferred embodiment, the method further includes the following steps after singulating the bonded silicon substrate and transparent substrate:

filling liquid crystal into a gap between the silicon substrate and the transparent substrate through the opening;

dispensing a sealing material to seal the opening; and curing the sealing material.

According to a preferred embodiment, the method further includes the following steps prior to dispensing or coating a sealing material on a predetermined area of the silicon substrate or the transparent substrate:

forming a first alignment layer on the silicon substrate or the transparent substrate; and forming a second alignment layer on the transparent substrate or the silicon substrate, the second alignment layer having a pattern aligned to a pattern of the first alignment layer.

According to a preferred embodiment, at least one first conductive bonding pad is located on the surrounding area of each display unit, and the method further includes the following steps before or after dispensing the conductive adhesive into the space:

fixing the silicon substrate onto a printed circuit board (PCB);

arranging a second connective bonding pad on the PCB corresponding to each first connective bonding pad; and connecting each first connective bonding pad to the corresponding second connective bonding pad.

According to a preferred embodiment, the method further includes coating a moisture-resistant insulation material onto the first connective bonding pads, the second connective bonding pads, the connective pads and the conductive adhesive.

To achieve the aforementioned objective, the present invention also provides a liquid crystal on silicon (LCOS) panel, which includes:

a silicon substrate on which at least one conductive pad is formed;

a transparent substrate on which a transparent electrode layer is formed;

a sealing material for bonding the silicon substrate with the transparent substrate;

at least one space located on an outer side of the sealing material and between the silicon substrate and the transparent substrate, a part of the transparent electrode layer being exposed in the space; and a conductive adhesive for connecting the transparent electrode layer to the conductive pad, at least a part of the conductive adhesive being located in the space.

According to a preferred embodiment, the conductive pad is partly or entirely located in the space.

According to a preferred embodiment, a cross-sectional width of the space is greater than 5 μm.

According to a preferred embodiment, a gap is formed between the silicon substrate and the transparent substrate, a height of the gap being 0.1 μm to 5 μm.

According to a preferred embodiment, the conductive adhesive is formed of a nano-silver conductive material, a nano-gold conductive material, a nano-copper conductive material, a nano-tin conductive material, a nano-carbon conductive material, a silicone conductive material, or a combination thereof.

According to a preferred embodiment, the silicon substrate includes at least one display unit, each display unit comprising a display area and a surrounding area surrounding the display area.

According to a preferred embodiment, the sealing material is a closed ring of sealing material surrounding the display area of each display unit.

According to a preferred embodiment, the sealing material is an unclosed ring of sealing material surrounding the display area of each display unit, the unclosed ring having an opening.

According to a preferred embodiment, the LCOS panel further includes:

a first alignment layer formed on the silicon substrate or the transparent substrate; and a second alignment layer formed on the transparent substrate or the silicon substrate.

According to a preferred embodiment, the second alignment layer has a pattern aligned to a pattern of the first alignment layer.

According to a preferred embodiment, at least one first connective bonding pad is arranged on the surrounding area of each display unit for connecting to a printed circuit board (PCB), a second connective bonding pad being arranged on the PCB corresponding to each first connective bonding pad, each first connective bonding pad being connected to the corresponding second connective bonding pad.

According to a preferred embodiment, the LCOS panel further includes a moisture-resistant insulation material coated on the first connective bonding pads, the second connective bonding pads, the connective gaskets and the conductive adhesive.

In the method of manufacturing LCOS panel of the present invention, the process of dispensing conductive adhesive is carried out after the scribing process. When the scribing process is completed, the sealing material has already been cured, so that the conductive adhesive will not be able to pass through the sealing material, thus thoroughly preventing the conductive adhesive from contaminating liquid crystal, and thereby reducing defects caused by short circuit or contamination to liquid crystal and improving production yield.

Moreover, as the conductive adhesive is dispensed into the space after the scribing process, low accuracy is required on the process of dispensing conductive adhesive. For this reason, in the present invention, the dispensing of the conductive adhesive can be performed by using a simple dispensing device, or even in a manual manner, thus reducing the process requirements and facilitating its application in large scale production.

In addition, as the present invention adopts the structure of directly connecting the transparent electrode layer to the silicon substrate through the conductive adhesive and the conductive gasket, the size of the LCOS panel can be effectively reduce.

To sum up, the method of manufacturing LCOS panel of the present invention is not only capable of effectively reducing the size of an LCOS panel, but also can achieve a higher production yield and a lower process requirement.

DETAILED DESCRIPTION

In the method of manufacturing LCOS panel of the present invention, the process of dispensing the conductive adhesive is carried out after the singulation process. In other words, when the singulation process is completed, the sealing material has already been cured, so that the conductive adhesive will not be able to pass through the sealing material, thus thoroughly preventing the conductive adhesive from contaminating liquid crystal and thereby reducing defects caused by short circuit or contamination to liquid crystal and improving production yield. Moreover, as the conductive adhesive is dispensed into the space after the singulation process, low accuracy is required on the process of dispensing conductive adhesive. For this reason, in the present invention, the application of the conductive adhesive can be performed by using a simple dispensing device, or even in a manual manner, thus reducing process requirements and facilitating its application in large scale production. In addition, as the present invention adopts the structure of directly connecting the transparent electrode layer to the silicon substrate through the conductive adhesive and the conductive pad, it can effectively reduce the size of LCOS panels. In other words, the method of manufacturing LCOS panel of the present invention is not only capable of effectively reducing the size of an LCOS panel, but also can achieve a higher production yield and lower process requirements.

Embodiments of the present invention will be described and specified by using specific examples and figures in follows, and those skilled in the art can easily understand other advantages and beneficial effects of this invention from contents of this description. The present invention can also be implemented or applied in other specific examples, and details of this description based on other views and applications can be made to various modifications and variations without departing from the spirit or scope of the invention.

Embodiment 1

Figure 1:
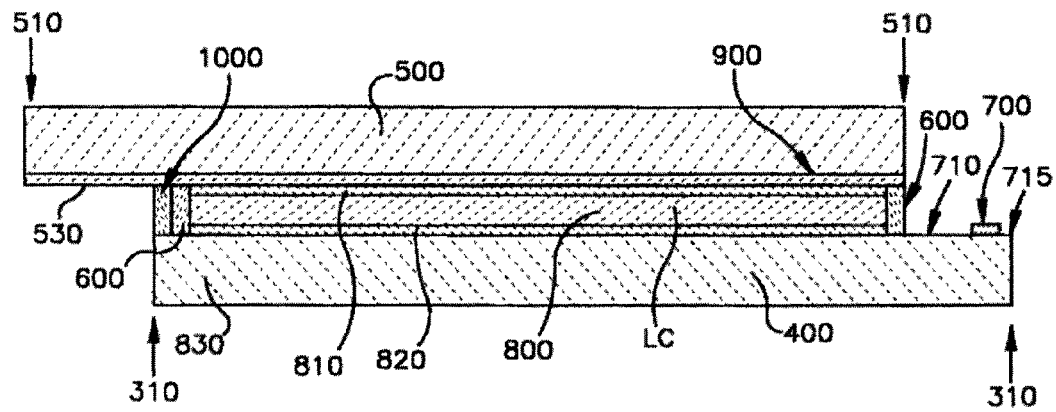
FIG. 1 is a cross-sectional view of an LCOS panel manufactured in the prior art.
Figure 2:
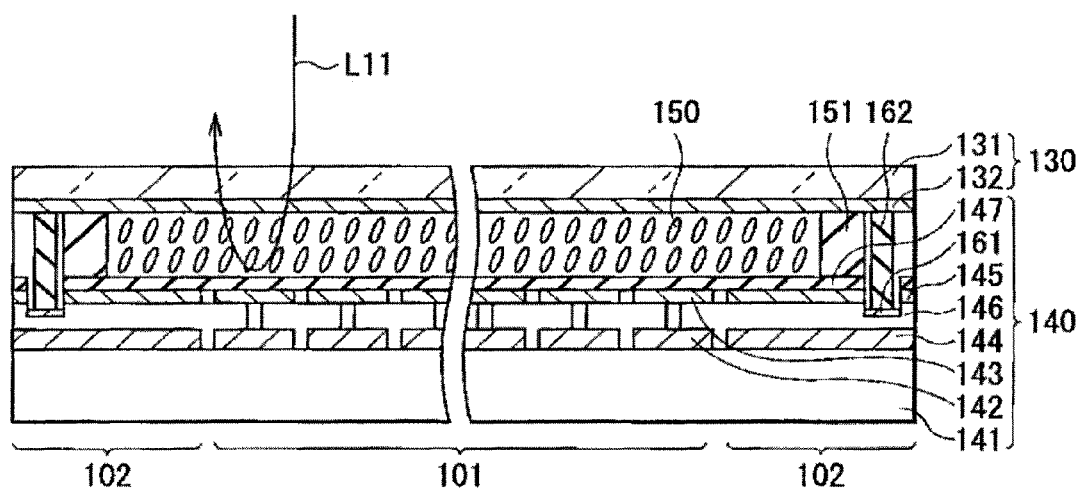
FIG. 2 is a cross-sectional view of another LCOS panel manufactured in the prior art.
Figure 3:
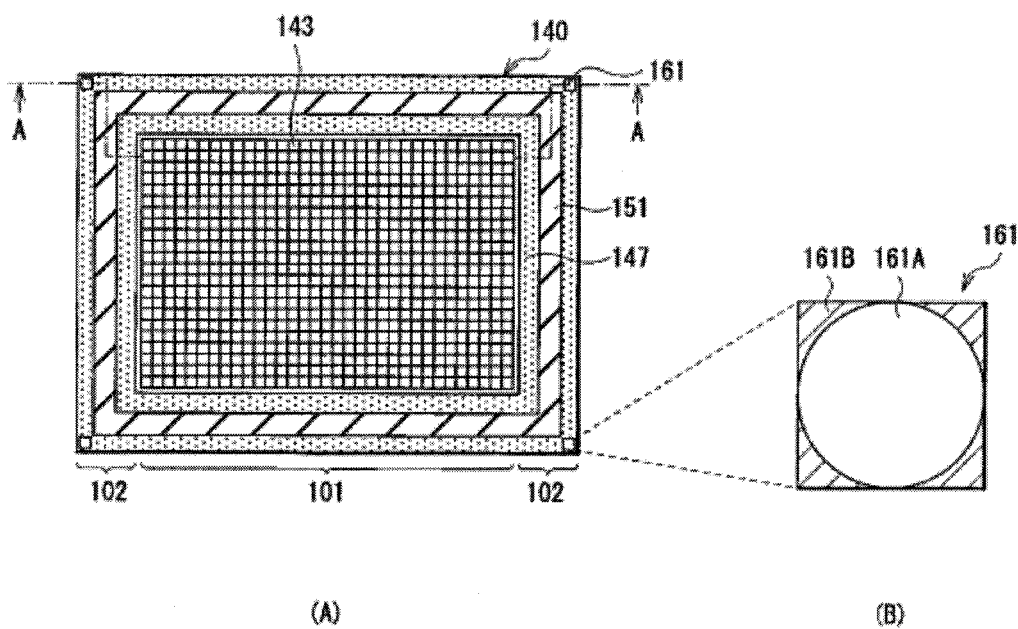
FIG. 3 is a plan view of the another LCOS panel manufactured in the prior art.
Figure 4:
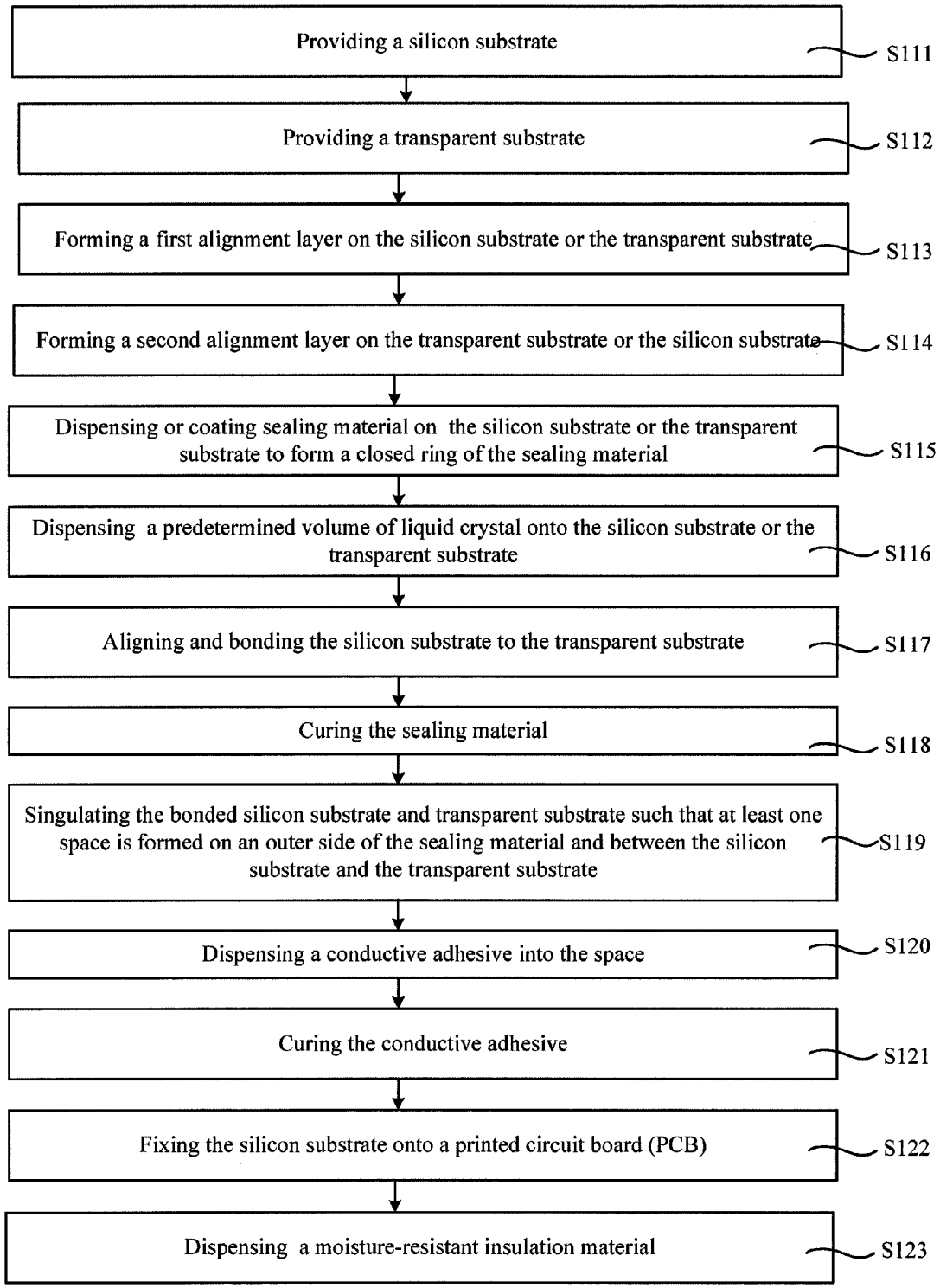
FIG. 4 is a flowchart of the LCOS panel manufacturing process according to embodiment 1 of the present invention.

Referring to FIG. 4, a method of manufacturing liquid crystal on silicon (LCOS) panel is provided in this embodiment, which includes the following steps:

Step S111: providing a silicon substrate;

Step S112: providing a transparent substrate;

Step S113: forming a first alignment layer on the silicon substrate or the transparent substrate;

Step S114: forming a second alignment layer on the transparent substrate or the silicon substrate;

Step S115: dispensing or coating a sealing material on a predetermined area of the silicon substrate or the transparent substrate to form a closed ring of the sealing material;

Step S116: dispensing a predetermined volume of liquid crystal onto the silicon substrate or the transparent substrate;

Step S117: aligning and bonding the silicon substrate with the transparent substrate;

Step S118: curing the sealing material;

Step S119: singulating the bonded silicon substrate and transparent substrate such that at least one space is provided between the silicon substrate and the transparent substrate on an outer side of the sealing material;

Step S120: dispensing a conductive adhesive into the space;

Step S121: curing the conductive adhesive;

Step S122: fixing the silicon substrate onto a printed circuit board (PCB);

Step S123: dispensing a moisture-resistant insulation material.

The method of manufacturing LCOS panel will be further described below with reference to FIGS. 4 to 16.

Figure 5:
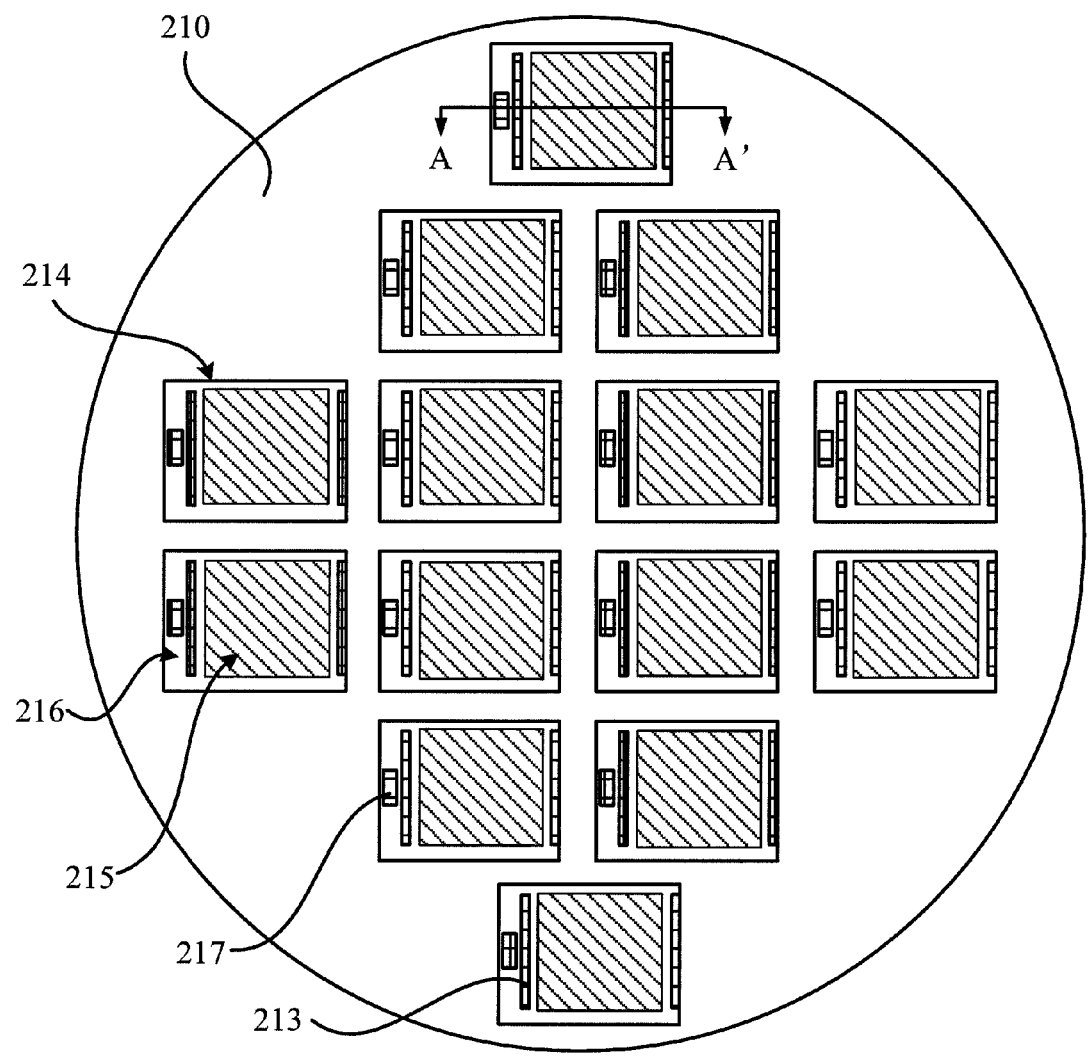
FIG. 5 is a plan view of a silicon substrate according to embodiment 1 of the present invention.

As shown in FIG. 5, firstly, step S111 is carried out to provide a silicon substrate 210. The silicon substrate 210 has at least one display unit 214, and each display unit 214 includes: a plurality of scanning lines, a plurality of data lines, a plurality of active devices (e.g. thin-film transistors), a plurality of pixel electrodes electrically connected to the active devices, at least one conductive pad 213 and at least one first connective bonding pad 217. The pixel electrodes are reflective electrodes such as aluminum electrodes or other electrodes with a good reflective characteristic.

Figure 6:
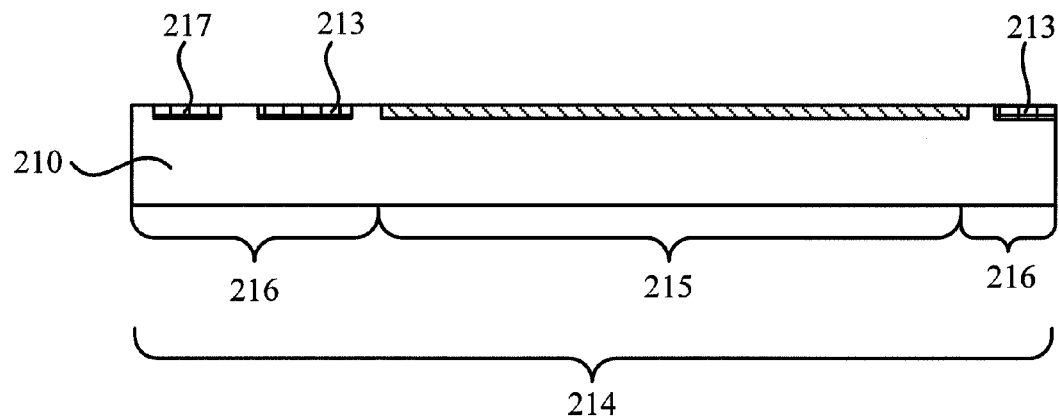
FIG. 6 is a cross-sectional view taken along a line A-A' of FIG. 5.

As shown in FIG. 5 and FIG. 6, the display unit 214 consists of a display area 215 and a surrounding area 216. The surrounding area 216 surrounds the display area 215. The scanning lines, the data lines, the active devices and the pixel electrodes electrically connected to the active devices are mainly provided on the display area 215, while the conductive pads 213 and the first connective bonding pad 217 are provided on the surrounding area 216.

Figure 7:
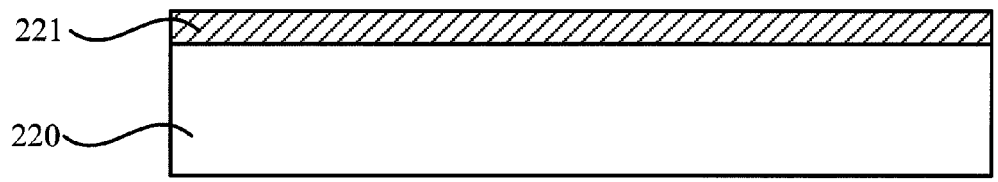
FIG. 7 is a cross-sectional view of a transparent substrate according to embodiment 1 of the present invention.

Next, as shown in FIG. 7, step S112 is carried out to provide a transparent substrate 220 which may be a glass substrate. A transparent electrode layer 221 made of indium tin oxide (ITO) or other transparent conductive material is formed on the transparent substrate 220.

It shall be appreciated that, step S112 may be performed after step S111 or prior to step S111, or steps S111 and S112 may be performed at the same time.

Figure 8:
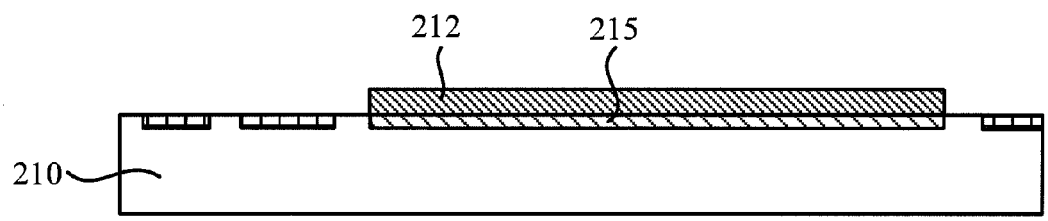
FIG. 8 is a cross-sectional view of the silicon substrate after formation of a first alignment layer according to embodiment 1 of the present invention.

After that, as shown in FIG. 8, step S113 is carried out to form a first alignment layer 212 on the silicon substrate 210. The first alignment layer 212 has a pattern that overlaps the display areas 215.

Figure 9:
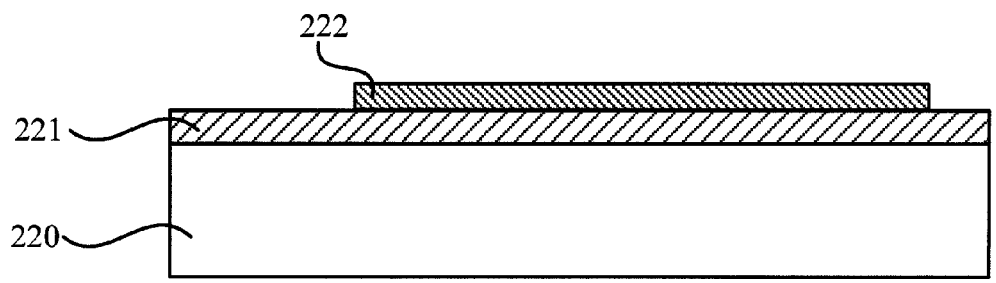
FIG. 9 is a cross-sectional view of the transparent substrate after formation of a second alignment layer according to embodiment 1 of the present invention.

Following step S113, as shown in FIG. 9, step S114 is carried out to form a second alignment layer 222 on the transparent electrode layer 221. The second alignment layer 222 has a pattern aligned to the pattern of the first alignment layer 212.

In the same way, it shall be appreciated that step S114 may be performed after step S113 or prior to step S113, or steps S113 and S114 may be performed at the same time.

Figure 10:
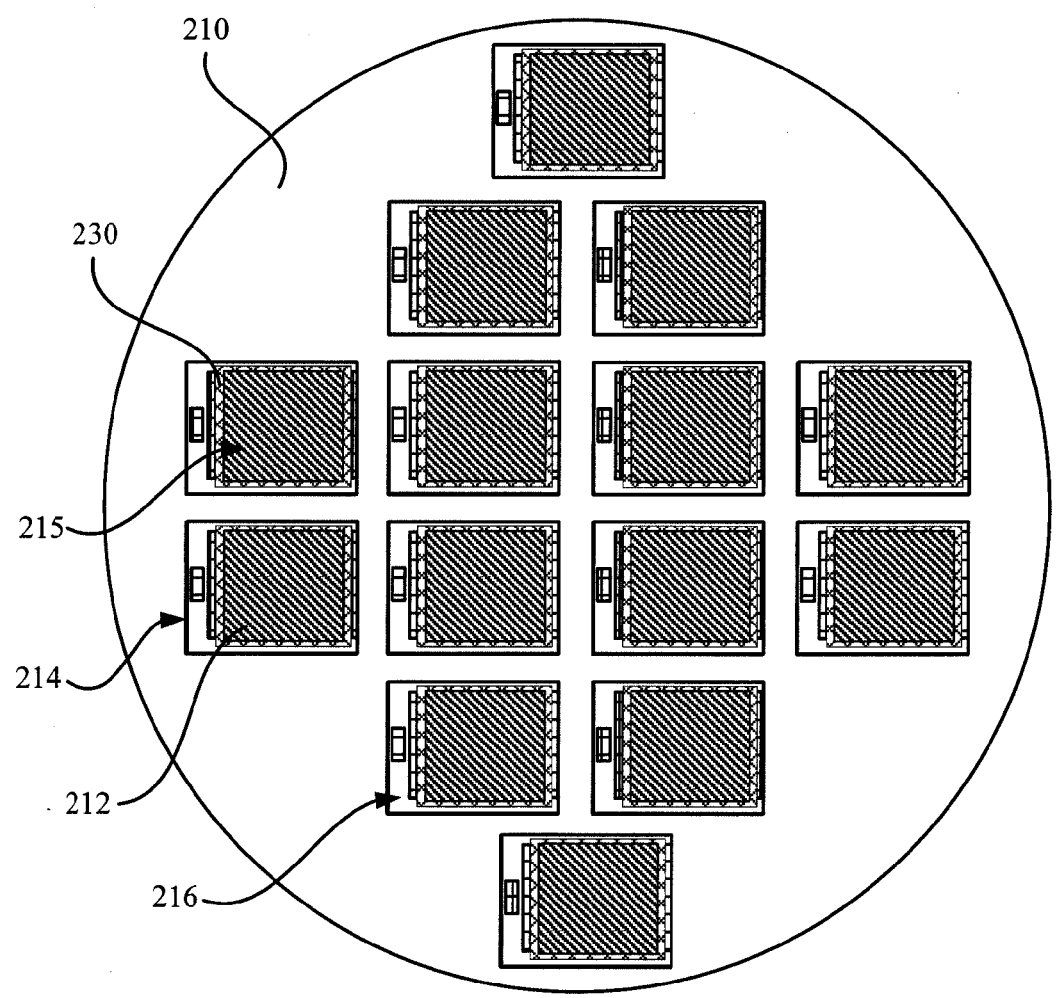
FIG. 10 is a plan view of the silicon substrate after coating of a sealing material according to embodiment 1 of the present invention.
Figure 11:
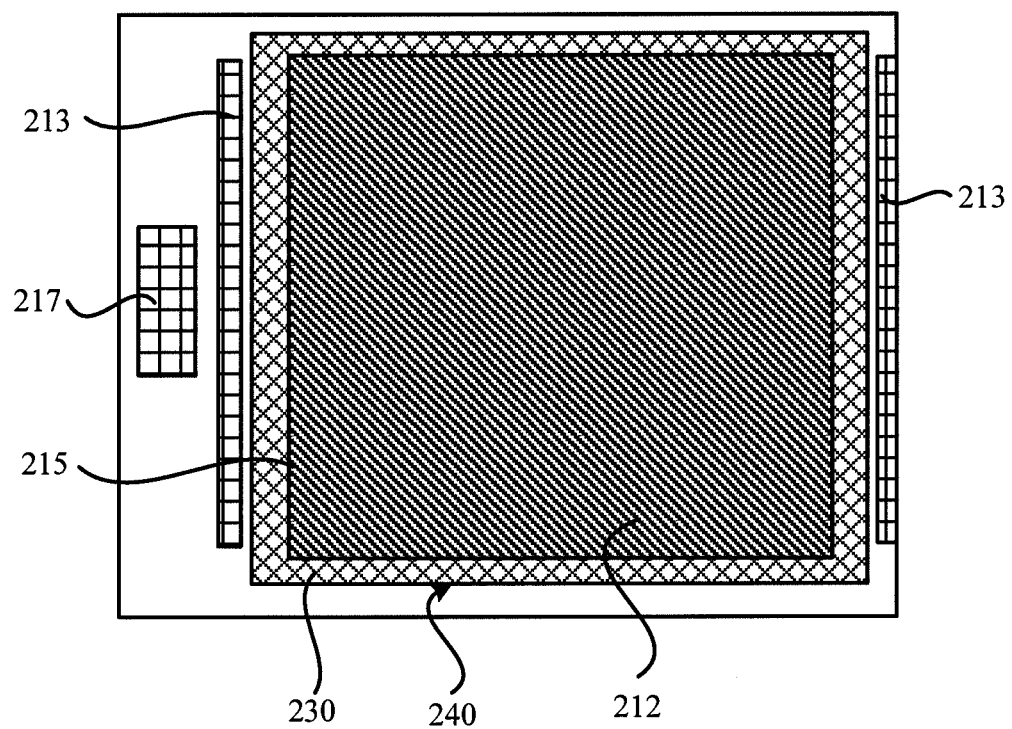
FIG. 11 is an enlarged plan view of a display unit of FIG. 10.

Next, as shown in FIG. 10 and FIG. 11, step S115 is carried out to coat or dispense a sealing material 230 on a predetermined area on the silicon substrate 210. In this embodiment, the sealing material 230 is coated or dispensed on the surrounding areas 216 to form a closed ring 240 of the sealing material surrounding each of the display areas 215. The display area 215 may have a rectangular shape, and thus the closed ring 240 formed may be a rectangular ring accordingly.

After that, step S116 is carried out to dispense a predetermined volume of liquid crystal onto the display areas 215. The dispensed volume of liquid crystal depends on the size of the display area 215 and other factors. Generally, a larger size of the display area 215 requires a greater volume of liquid crystal to be dispensed. In addition, in order to obtain an even distribution of the liquid crystal on the display area, in a general practice, the liquid crystal is dispensed several times at predetermined locations, and the evenness of the distribution of liquid crystal can be improved by controlling the volume at each dispense location and adjusting positions of the predetermined locations.

Figure 12:
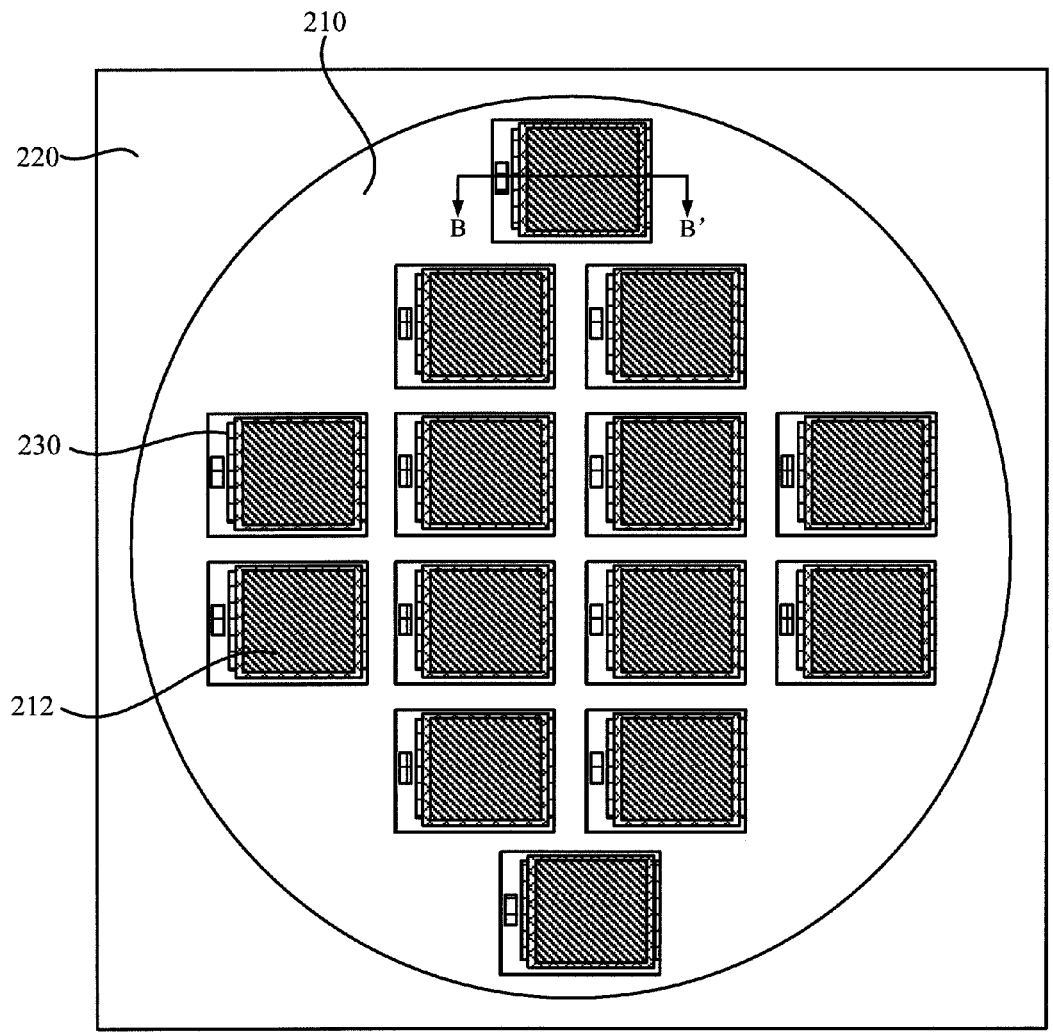
FIG. 12 is a plan view of the silicon substrate and the transparent substrate which are bonded according to embodiment 1 of the present invention.

Next, as shown in FIG. 12, step S117 is carried out to turn over the transparent substrate 220 and place it above the silicon substrate 210 and align and bond them together. In a general case, a vacuum alignment method is employed in this step, which includes: putting the silicon substrate 210 with liquid crystal dispensed on it in an alignment machine; turning the transparent substrate 220 upside down and also putting it in the alignment machine at such a position that it is above the silicon substrate 210; aligning the transparent substrate 220 with the silicon substrate 210; closing the door of the alignment machine and creating a vacuum environment in the machine; after the vacuum degree of the alignment machine reaches a preset value, lowering the transparent substrate 220 onto the silicon substrate 210 such that they will be bonded together by the sealing material 230.

Figure 13:
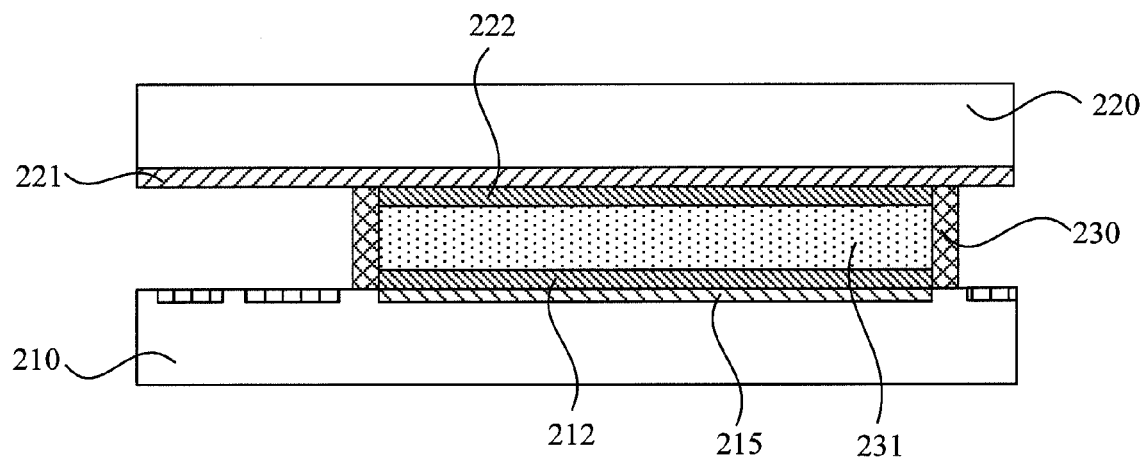
FIG. 13 is a cross-sectional view taken along a line B-B' of FIG. 12.

Referring to FIG. 13, as spacers have been added into the sealing material 230 in advance according to a preset ratio, a gap is formed between the silicon substrate 210 and the transparent substrate 220 after they are bonded. The gap is completely filled by the dispensed liquid crystal 231. The liquid crystal 231 is aligned by the first alignment layer 212 and the second alignment layer 222. The spacers are generally ball-shaped. Preferably, the height of the gap may be 0.1 µm to 5 µm, which ensures a suitable height of the space outside the ring of the sealing material 230 so that a conductive adhesive could be conveniently dispensed into the space in a subsequent step, and prevents variation defects caused by a too large gap height.

In this embodiment, the sealing material 230 is applied on the silicon substrate 210; liquid crystal is also dispensed onto the silicon substrate 210; and the transparent substrate 220 is turned upside down for bonding. However, it should be appreciated that the purpose of the present invention will still be achieved when the above steps are performed with the substrates interchanged, i.e., the sealing material 230 is applied on the transparent substrate 220; liquid crystal is also dispensed onto the transparent substrate 220; and the silicon substrate 210 is turned upside down for bonding.

After that, step S118 is carried out to pre-cure the sealing material 230 by irradiating it with ultra violet (UV) light, and to cure it by heating it in a high-temperature oven. The pre-curing and curing processes are known to those skilled in the art and will not be further specified herein.

Figure 14:
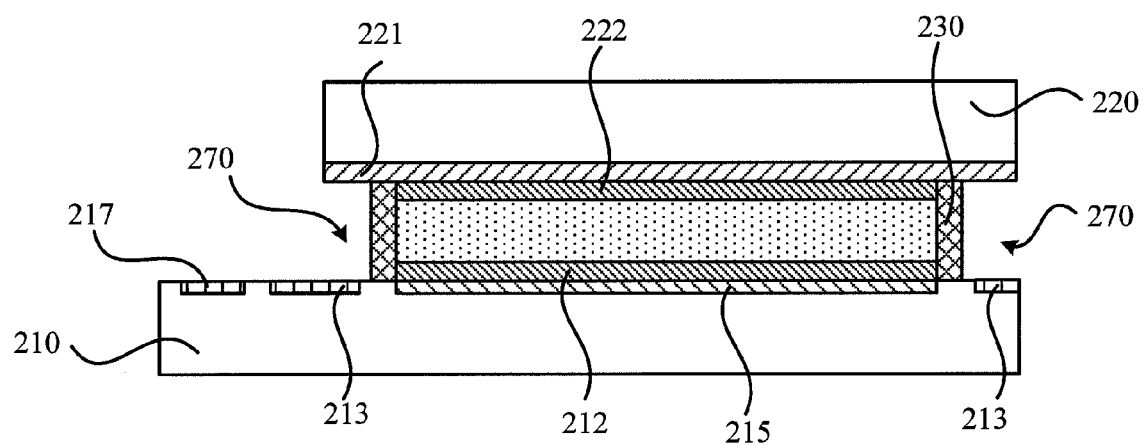
FIG. 14 is a cross-sectional view of the silicon substrate and the transparent substrate which are scribed according to embodiment 1 of the present invention.

Following, step S119 is carried out to singulate the bonded and cured silicon substrate 210 and transparent substrate 220 into at least one liquid crystal cell having a predetermined shape. As shown in FIG. 14, in each liquid crystal cell, at least one space 270 is provided between the silicon substrate 210 and the transparent substrate 220 on an outer side of the sealing material 230, and a part of the transparent electrode layer 221 is exposed in the space 270. At least one conductive pad 213 is formed on the silicon substrate 210 corresponding to the space 270. The conductive pad 213 may be partly or entirely located in the space 270, or may be located outside the space 270. The singulation process may be performed such that only one space 270 is formed on one outer side of the sealing material 230, or may be performed such that two or more spaces 270 are formed on outer sides of the sealing material 230. FIG. 14 shows the case that two spaces 270 are formed on opposite outer sides of the sealing material 230. In order to further reduce the size of the LCOS panel, it is also possible to form only one space on one outer side of the sealing material 230.

Figure 15:
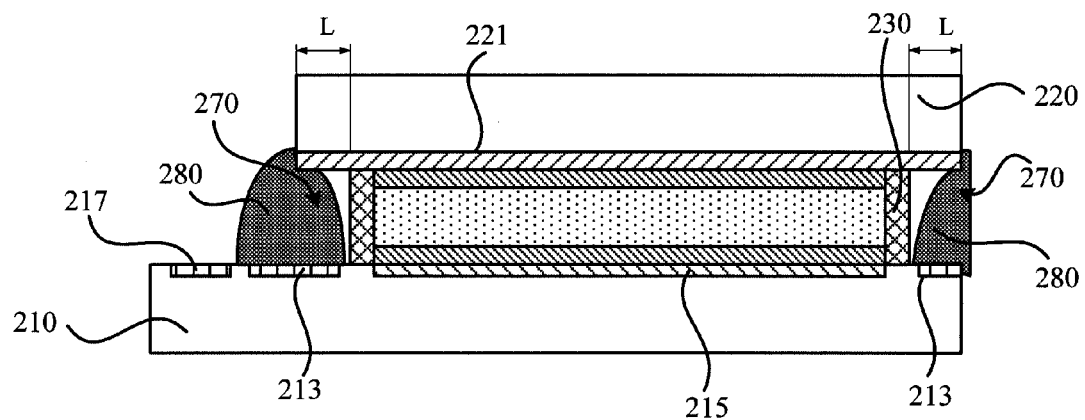
FIG. 15 is a cross-sectional view of the silicon substrate and the transparent substrate after a conductive adhesive is dispensed according to embodiment 1 of the present invention.

Next, as shown in FIG. 15, step S120 is carried out to dispense a conductive adhesive 280 into the space 270 such that the conductive adhesive 280 is in contact with both the transparent electrode layer 221 on the transparent substrate 220 and the conductive pad 213 on the silicon substrate 210, thus electrically connecting them to each other.

In this embodiment, not only within the space 270, the conductive pad 213 may also extend outside the space 270. In this manner, a successful connection between the transparent electrode layer 221 and the conductive pad 213 can be ensured even when there is a discrepancy between the actual and the intended locations of the dispensed conductive adhesive 280. To prevent the occurrence of short circuit between the conductive pad 213 and the first connective bonding pad 217 or other circuit or device, the size of the conductive pad 213 should not be too large. In another embodiment of the present invention, the conductive pad 213 is located within the space 270 and the cross-sectional width (the width along the direction of the radial direction of the silicon substrate 210) of the conductive pad 213 is smaller than or equal to the cross-sectional width L (the width along the direction of the radial direction of the silicon substrate 210) of the space 270, i.e., the conductive pad 213 is entirely located within the space 270 without extending outside it. In still another embodiment of the present invention, the conductive pad 213 is located outside the space 270 to prevent corrosion of the conductive pad 213 by the sealing material 230 caused by their contact.

As shown in FIG. 15, after the conductive adhesive 280 is dispensed into the space 270, it contacts with both a front face and a side face of the transparent electrode layer 221. Defects generated in the process of dispensing the conductive adhesive 280 can be eliminated by removing the dispensed conductive adhesive 280 using a certain solution and then performing the dispensing of the conductive adhesive 280 for another time. In this embodiment, as the conductive adhesive 280 is dispensed to cover the open side of the space 270, the conductive adhesive 280 is easier to be removed when a defect is generated. Moreover, in the rework process, the connection between the conductive pad 213 and the transparent electrode layer 221 can be achieved when the conductive adhesive 280 contacts with either the front surface or the side face of the transparent electrode layer 221. Thus, the practice of eliminating defects by rework process is feasible in this embodiment.

Moreover, in some other embodiments, the front surface of the transparent electrode layer 221 may be covered by an insulation film. In existing methods, a part of the insulation film must be removed to expose part of the front surface of the transparent electrode layer 221 before dispensing conductive adhesive 280. In contrast, in the method of the present invention, as an electrical connection can be achieved by connecting the side face of the transparent electrode layer 221 with the conductive pad 213, there is no need to remove part of the insulation film, thus simplifying the process.

In step S120, a larger space 270 may accommodate a greater amount of conductive adhesive 280 and thus can better ensure the successful connection between the conductive pad 213 and the transparent electrode layer 221. Preferably, the space 270 may have a cross-sectional width L of greater than 5 μm; the conductive adhesive 280 may be formed of any conductive material, including for example a nano-silver conductive material, a nano-gold conductive material, a nano-copper conductive material, a nano-tin conductive material, a nano-carbon conductive material and a silicone conductive material, or a combination thereof. In addition, the performance of the dispensing process can be improved by adjusting the viscosity of the conductive adhesive 280 and the pressure for dispensing the adhesive.

After that, step S121 is carried out to cure the conductive adhesive 280, generally with a room-temperature curing method, at a temperature of 25~35 degrees centigrade, for 22 hours to 24 hours. In order to shorten the curing time, the conductive adhesive 280 may also be cured with a high-temperature curing method, at a temperature of 100~150 degrees centigrade, for 0.5 hour to 1 hour.

Figure 16:
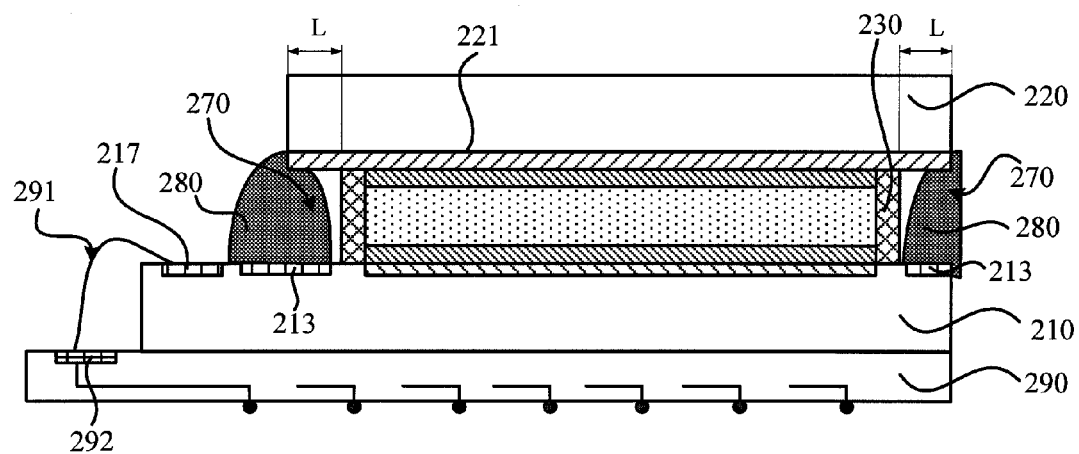
FIG. 16 is a cross-sectional view of the silicon substrate fixed on a printed circuit board according to embodiment 1 of the present invention.

Next, as shown in FIG. 16, step S122 is carried out to fix the silicon substrate 210 onto a printed circuit board (PCB) 290 and to connect the first connective bonding pad 217 to the PCB 290 so as to provide a voltage to the silicon substrate 210. Specifically, there is at least one second connective bonding pad 292 arranged on the PCB 290, the first connective bonding pad 217 is connected to a corresponding second connective bonding pad 292 through a wire 291. Moreover, as there are other internal circuits arranged on the silicon substrate 210, it is also possible to convert the voltage provided by the PCB 290 to a common voltage required by the transparent electrode layer 221, and provide the common voltage to the transparent electrode layer 221 through the conductive adhesive 280.

Figure 17:
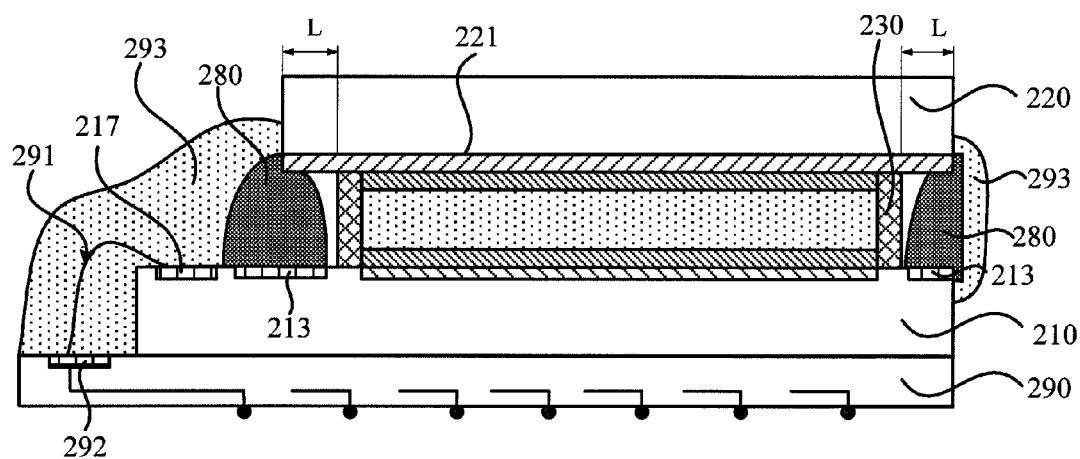
FIG. 17 is a cross-sectional view of a structure formed after a moisture-resistant insulation material is coated according to embodiment 1 of the present invention.

Finally, as shown in FIG. 17, step S123 is carried out to coat a moisture-resistant insulation material 293 on the first connective bonding pad 217, the wire 291, the second connective bonding pad 292, the conductive pads 213 and the conductive adhesive 280. The moisture-resistant insulation material 293 is capable of effectively reducing the influence of the ambient temperature and humidity on the first connective bonding pad 217, the wire 291, the second connective bonding pad 292, the conductive pads 213 and the conductive adhesive 280, thus improving the long-term reliability of the whole device. Moreover, as the moisture-resistant insulation material 293 isolates the first connective bonding pad 217, the wire 291, the second connective bonding pad 292, the conductive pads 213 and the conductive adhesive 280 from the ambient atmosphere, accidental conductive contact caused by contact between these components with other conductive devices can be prevented, thus also improving the stability of the whole device. After step S123 is carried out, the manufacturing of the LCOS panel is completed.

It shall be appreciated that steps S120 and S121 could be carried out after step S122 in some other embodiments, namely the silicon substrate 210 may be fixed onto the PCB 290 and form connection between the first and second connective bonding pads 217 and 292 prior to dispensing the conductive adhesive 280 into the space 270.

Overall, the liquid crystal dispensing method adopted in this embodiment is capable of more effectively performing liquid crystal filling and is more suitable for the production of larger-size LCOS panels. Moreover, as liquid crystal is filled by a dispensing process, the sealing material can be formed into a closed ring without considering how to design an opening in it and how to deal with the position relationships between the opening and the conductive pads, thus ensuring convenience and flexibility in the configuration of positions of the conductive pads.

Embodiment 2

In this embodiment, another method of manufacturing liquid crystal on silicon (LCOS) panel is provided, which adopts a different liquid crystal filling method compared with that of embodiment 1. In embodiment 1, liquid crystal is filled by a dispensing method, while in this embodiment, liquid crystal is filled by a filling method.

Figure 18:
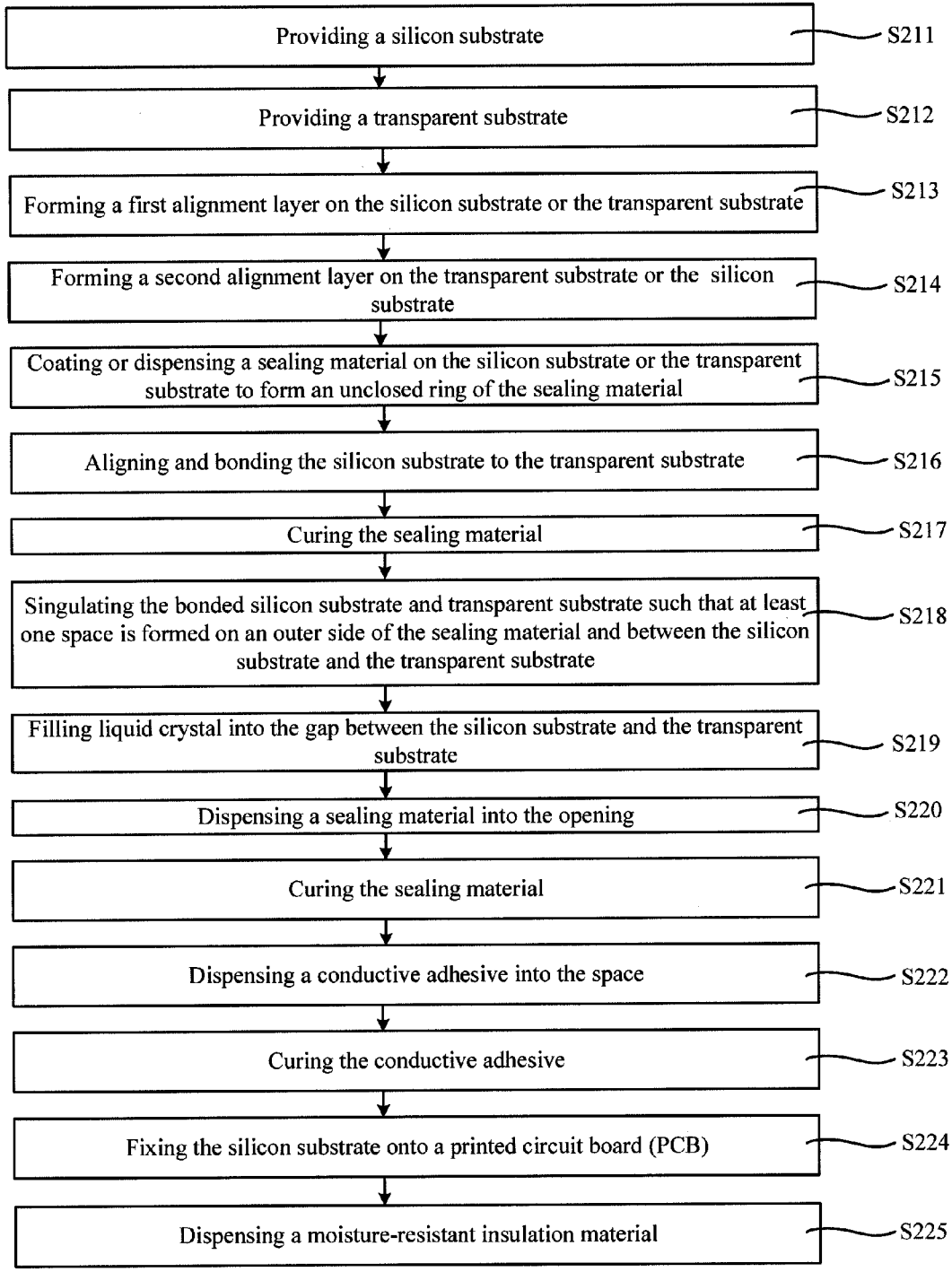
FIG. 18 is a flowchart of a LCOS panel manufacturing process in accordance with the embodiment 2 of the present invention.

Referring to FIG. 18, the method of manufacturing LCOS panel of this embodiment includes the following steps:

Step S211: providing a silicon substrate;

Step S212: providing a transparent substrate;

Step S213: forming a first alignment layer on the silicon substrate or the transparent substrate;

Step S214: forming a second alignment layer on the transparent substrate or the silicon substrate;

Step S215: coating or dispensing a sealing material on a predetermined area of the silicon substrate or the transparent substrate to form one or more unclosed rings of the sealing material, each unclosed ring having an opening;

Step S216: aligning and bonding the silicon substrate with the transparent substrate;

Step S217: curing the sealing material;

Step S218: singulating the bonded silicon substrate and transparent substrate such that at least one space is provided between the silicon substrate and the transparent substrate on an outer side of the sealing material;

Step S219: filling liquid crystal into the gap between the silicon substrate and the transparent substrate through the opening;

Step S220: dispensing a sealing material into the opening;

Step S221: curing the sealing material;

Step S222: dispensing a conductive adhesive into the space;

Step S223: curing the conductive adhesive;

Step S224: fixing the silicon substrate onto a printed circuit board (PCB);

Step S225: dispensing a moisture-resistant insulation material.

The method of manufacturing LCOS panel of this embodiment will be further described below with reference to FIGS. 18 to 22.

First, steps S211 to S214 are performed to: provide a silicon substrate 310 and a transparent substrate 320; form a first alignment layer 312 on the silicon substrate 310; and form a second alignment layer 322 on the transparent substrate 320. As steps S211 to S214 are same with steps S111 to S114 in embodiment 1, no further descriptions will be given herein.

Figure 19:
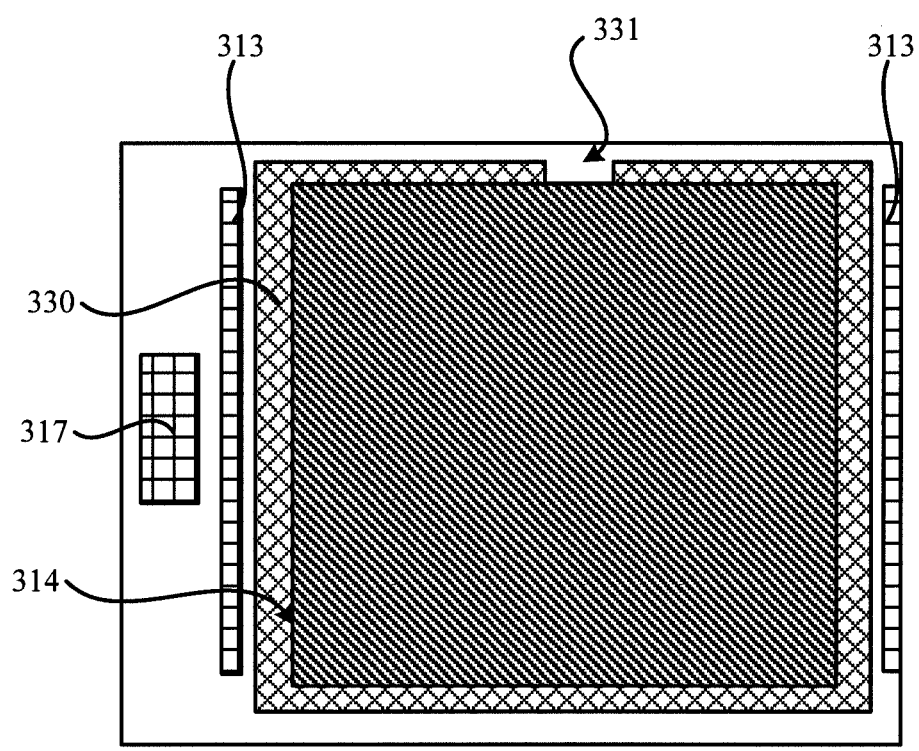
FIG. 19 is an enlarged plan view illustrating a display unit after a sealing material is applied on a silicon substrate in the embodiment 2 of the present invention.

Next, as shown in FIG. 19, step S215 is carried out to apply a first sealing material 330 on a predetermined area on the silicon substrate. In this embodiment, the first sealing material 330 is dispensed or coated on the surrounding area 216 of each display unit so as to form an unclosed ring 330 of the sealing material surrounding each display area 215. An opening 331 for liquid crystal filling is formed in the unclosed ring 330 of the sealing material.

After that, steps S216 and S217 are carried out to: turn over the transparent substrate and place it above the silicon substrate; align and bond the substrates together; pre-cure the first sealing material 330 by irradiating it with ultra violet (UV) light; and cure it by heating it in a high-temperature oven.

Figure 20:
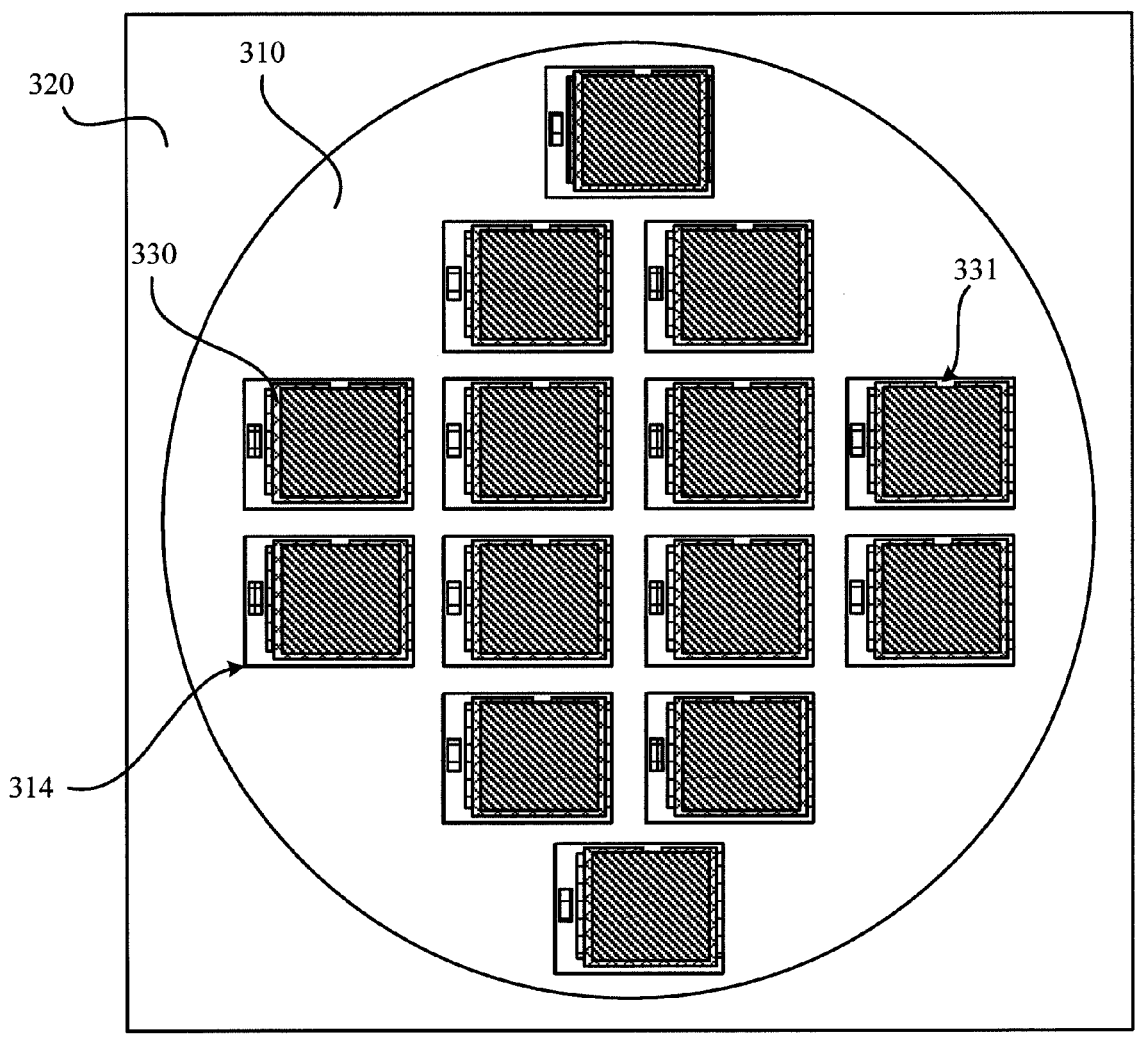
FIG. 20 is a plan view of the silicon substrate and the transparent substrate which are bonded according to embodiment 2 of the present invention.
Figure 21:
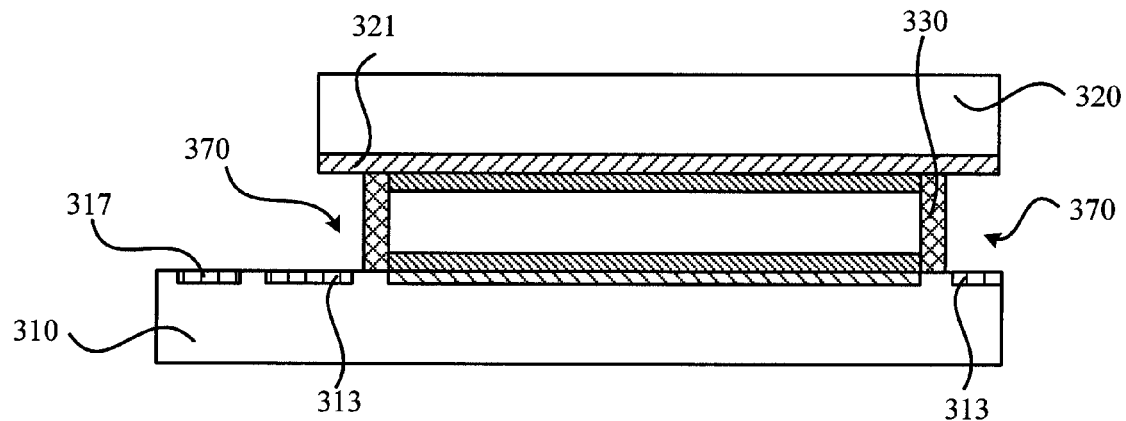
FIG. 21 is a cross-sectional view of the silicon substrate and the transparent substrate which are scribed according to embodiment 2 of the present invention.

Following, as shown in FIG. 20, step S218 is carried out to singulate the bonded and cured silicon substrate 310 and transparent substrate 320 into at least one liquid crystal cell having a predetermined shape. As shown in FIG. 21, in each liquid crystal cell, at least one space 370 is formed on an outer side of the first sealing material 330 and between the silicon substrate 310 and the transparent substrate 320. The singulation process may be performed such that only one space 370 is formed on one outer side of the rectangular ring of the first sealing material 330, or may be performed such that two or more spaces 370 are formed on several outer sides of the first sealing material 330.

Next, step S219 is performed to completely fill the hollow liquid crystal cell with liquid crystal by dipping the opening 331 of the liquid crystal cell into liquid crystal and siphoning liquid crystal into the liquid crystal cell, or by pulling vacuum in the liquid crystal cell first and then dipping the opening 331 of the liquid crystal cell into liquid crystal so that liquid crystal will be vacuum filled into the liquid crystal cell by a pressure difference.

Figure 22:
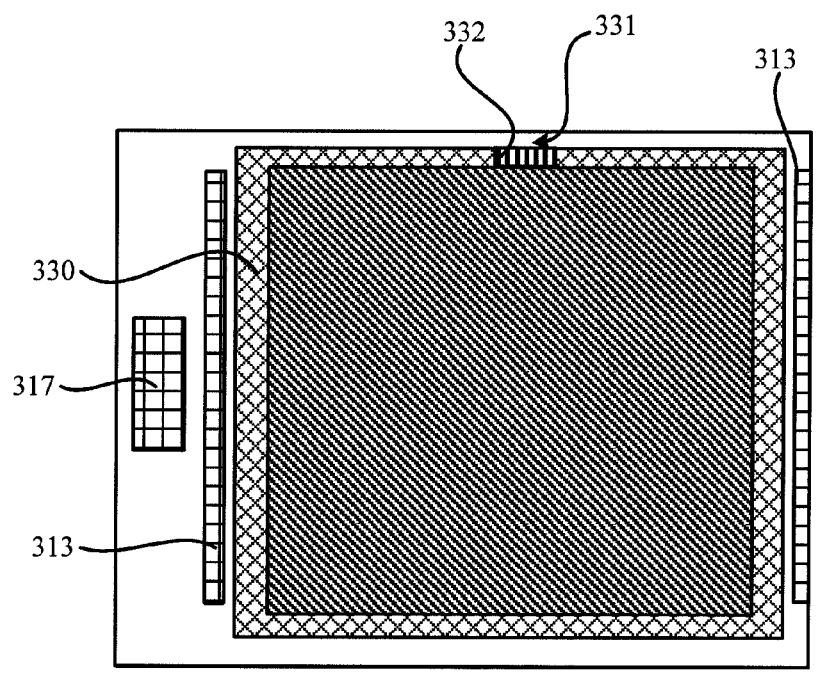
FIG. 22 is a plan view illustrating a structure formed after the sealing material is applied into an opening in an unclosed ring of the sealing material according to embodiment 2 of the present invention.

After that, as shown in FIG. 22, steps S220 and S221 are carried out to dispense a second sealing material 332 into the opening 331 to seal the opening 331 and then cure the second sealing material 332.

Preferably, the conductive pad 313 shall not be located only on the side that the opening 331 is formed, because the opening 331 is to be filled by the second sealing material 332, which is generally an insulating material, to seal the unclosed ring 340, so as to prevent the occurrence of short circuit of liquid crystal. If the conductive pad 313 is located only on the side where the opening 331 is formed, a high accuracy process will be required during the step of dispensing second sealing material 332 to ensure that the conductive pad 313 remains at least partly exposed after the second sealing material 332 is filled into the opening 331. Therefore, it is preferred that the conductive pads 313 are located in those spaces 370 which do not involve the opening 331 or should be located in both the space 370 involving the opening 331 and in at least one of the other spaces 370, such that even when the conductive pad 313 near the opening 331 is completely covered by the second sealing material 332, the transparent electrode layer 321 of the transparent substrate 320 can still be electrically connected to the silicon substrate 310 through the conductive pads 313 located in the other spaces 370.

Next, steps S222 to S225 are carried out. As these steps are same with steps S120 to S123 in embodiment 1, respectively, no further descriptions on them will be given herein.

Compared to embodiment 1, the liquid crystal filling device used in the liquid crystal filling method of this embodiment is yet simpler and has a lower cost. This liquid crystal filling method is more suitable to be adopted in manufacturing processes of small-size LCOS panels.

Correspondingly, the present invention also provides an LCOS panel fabricated by using methods in accordance with the above embodiments 1 or 2.

Referring to FIG. 16, the LCOS panel includes:

a silicon substrate 210 on which at least one conductive pad 213 is formed;

a transparent substrate 220 on which a transparent electrode layer 221 is formed;

a sealing material 230 for bonding the silicon substrate 210 with the transparent substrate 220;

at least one space 270 located on an outer side of the sealing material 230 and between the silicon substrate 210 and the transparent substrate 220, a part of the transparent electrode layer and at least a part of the at least one conductive pad being exposed in the space; and a conductive adhesive 280 for connecting the transparent electrode layer 221 and at least one of the conductive pads 213, at least a part of the conductive adhesive being located in the space 270.

In conclusion, in the present invention, after the silicon substrate 210 and the transparent substrate 220 are singulated, at least one space 270 is formed on an outer side of the sealing material 230 and between the silicon substrate and the transparent substrate, and a conductive adhesive 280 is dispensed into the space 270; a transparent electrode layer 221 is formed on the surface of the transparent substrate opposite to the silicon substrate, at least one conductive pad 213 is arranged on the silicon substrate in a position corresponding to the space 270; and after the conductive adhesive 280 is dispensed, it can connect the transparent electrode layer 221 and the conductive pad 213. In other words, the transparent electrode layer 221 is directly connected to the silicon substrate 210 through the conductive adhesive 280 and the conductive pad 213. Therefore, the size of the LCOS panel can be effective reduced.

At the same time, in the present invention, the process of dispensing the conductive adhesive 280 is carried out after the singulation process. In other words, when the singulation process is completed, the sealing material 230 has already been cured, so that the conductive adhesive 280 will not be able to pass through the sealing material 230, thus thoroughly preventing the conductive adhesive from contaminating liquid crystal, and thereby reducing defects caused by short circuit or contamination to liquid crystal and improving production yield.

Moreover, as the conductive adhesive 280 is dispensed into the space 270 after the singulation process, low accuracy is required on the process of dispensing conductive adhesive. For this reason, in the present invention, the dispensing of the conductive adhesive can be performed by using a simple dispensing device, or even in a manual way, thus reducing process requirements and facilitating its application in large scale production.

Therefore, as the present invention adopts the structure of directly connecting the transparent electrode layer to the silicon substrate through the conductive adhesive and the conductive pad, the size of the LCOS panel can be effectively reduce.

To sum up, the method of manufacturing LCOS panel of the present invention is not only capable of effectively reducing the size of an LCOS panel, but also can achieve a higher production yield and a lower process requirement.

It should be noted that as each embodiment in this specification is described in a progressive manner and emphasis of the description is given on addressing difference between embodiments, cross reference should be made to the same or similar parts between different embodiments.

Obviously, those skilled in the art can make various variations and modifications without departing from the spirit or scope of the invention. Thus, it is intended that the present invention cover these modifications and variations provided they come within the scope of the appended claims and their equivalents.

What is claimed is:

1. A method of manufacturing liquid crystal on silicon (LCOS) panel, comprising the following steps in the sequence set forth:
   providing a silicon substrate and a transparent substrate, the silicon substrate having at least one conductive pad formed thereon, the transparent substrate having a transparent electrode layer formed thereon;
   dispensing or coating a sealing material on a predetermined area of the silicon substrate or the transparent substrate;
   bonding the silicon substrate with the transparent substrate;
   singulating the bonded silicon substrate and transparent substrate such that at least one space is provided between the silicon substrate and the transparent substrate on an outer side of the sealing material, a part of the transparent electrode layer being exposed in the space; and dispensing a conductive adhesive into the space to connect the transparent electrode layer to the conductive pad.

2. The method according to claim 1, wherein the conductive pad is partly or entirely located in the space.

3. The method according to claim 1, wherein the silicon substrate comprises at least one display unit, each display unit comprising a display area and a surrounding area, the surrounding area surrounding the display area.

4. The method according to claim 3, wherein dispensing or coating a sealing material on a predetermined area of the silicon substrate or the transparent substrate comprises dispensing or coating a sealing material to form a closed ring surrounding the display area of each display unit or dispensing or coating a sealing material on a corresponding area of the transparent substrate.

5. The method according to claim 4, further comprising dispensing liquid crystal onto the silicon substrate or the transparent substrate after dispensing or coating a sealing material on a predetermined area of the silicon substrate or the transparent substrate and before bonding the silicon substrate with the transparent substrate.

6. The method according to claim 3, wherein dispensing or coating a sealing material on a predetermined area of the silicon substrate or the transparent substrate comprises dispensing or coating a sealing material to form an unclosed ring surrounding the display area of each display unit or dispensing or coating a sealing material on a corresponding area of the transparent substrate, the unclosed ring having an opening.

7. The method according to claim 6, further comprising the following steps after singulating the bonded silicon substrate and transparent substrate: filling liquid crystal into a gap between the silicon substrate and the transparent substrate through the opening; dispensing a sealing material to seal the opening; and curing the sealing material.

8. The method according to claim 3, further comprising the following steps prior to dispensing or coating a sealing material on a predetermined area of the silicon substrate or the transparent substrate:
   forming a first alignment layer on the silicon substrate or the transparent substrate; and
   forming a second alignment layer on the transparent substrate or the silicon substrate, the second alignment layer having a pattern aligned to a pattern of the first alignment layer.

9. The method according to claim 3, wherein at least one first connective bonding pad is located on the surrounding area of each display unit, and the method further comprises the following steps before or after dispensing the conductive adhesive into the space:
   fixing the silicon substrate onto a printed circuit board (PCB);
   arranging a second connective bonding pad on the PCB corresponding to each first connective bonding pad; and
   connecting each first connective bonding pad to the corresponding second connective bonding pad.

10. The method according to claim 9, further comprising coating a moisture resistant insulation material onto the first connective bonding pads, the second connective bonding pads, the conductive pads and the conductive adhesive.

11. A liquid crystal on silicon (LCOS) panel manufactured by using the method according to claim 1, comprising:
   a silicon substrate on which at least one conductive pad is formed;
   a transparent substrate on which a transparent electrode layer is formed;

a sealing material for bonding the silicon substrate with the transparent substrate;

at least one space located on an outer side of the sealing material and between the silicon substrate and the transparent substrate, a part of the transparent electrode layer being exposed in the space; and a conductive adhesive for connecting the transparent electrode layer to the conductive pad, at least a part of the conductive adhesive being located in the space.

12. The LCOS panel according to claim 11, wherein the conductive pad is partly or entirely located in the space.

13. The LCOS panel according to claim 11, wherein a cross-sectional width of the space is greater than 5 µm.

14. The LCOS panel according to claim 11, wherein a gap is formed between the silicon substrate and the transparent substrate, a height of the gap being 0.1 µm to 5 µm.

15. The LCOS panel according to claim 11, wherein the conductive adhesive is formed of a nano-silver conductive material, a nano-gold conductive material, a nano-copper conductive material, a nano-tin conductive material, a nano-carbon conductive material, a silicone conductive material, or a combination thereof.

16. The LCOS panel according to claim 11, wherein the silicon substrate comprises at least one display unit, each display unit comprising a display area and a surrounding area surrounding the display area.

17. The LCOS panel according to claim 16, wherein the sealing material is a closed ring of sealing material surrounding the display area of each display unit.

18. The LCOS panel according to claim 16, wherein the sealing material is an unclosed ring of sealing material surrounding the display area of each display unit, the unclosed ring having an opening.

19. The LCOS panel according to claim 16, further comprising:

a first alignment layer formed on the silicon substrate or the transparent substrate; and a second alignment layer formed on the transparent substrate or the silicon substrate.

20. The LCOS panel according to claim 19, wherein the second alignment layer has a pattern aligned to a pattern of the first alignment layer.

21. The LCOS panel according to claim 11, wherein at least one first connective bonding pad is arranged on the surrounding area of each display unit for connecting to a printed circuit board (PCB), a second connective bonding pad being arranged on the PCB corresponding to each first connective bonding pad, each first connective bonding pad being connected to the corresponding second connective bonding pad.

22. The LCOS panel according to claim 21, further comprising a moisture-resistant insulation material coated on the first connective bonding pads, the second connective bonding pads, the conductive pads and the conductive adhesive.

* * * * *